(12) United States Patent
Martin et al.

(10) Patent No.: US 8,583,334 B2
(45) Date of Patent: Nov. 12, 2013

(54) DETERMINATION METHOD FOR ACTUATION TOUCH POINT PRESSURE VALUE OF A FRICTION SHIFT ELEMENT

(75) Inventors: Gerhard Hermann Martin, Tettnang (DE); Wilfrid Eberhard, Tettnang (DE); Bernd Ummer, Bodnegg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 230 days.

(21) Appl. No.: 13/207,814

(22) Filed: Aug. 11, 2011

(65) Prior Publication Data

US 2012/0041652 A1 Feb. 16, 2012

(30) Foreign Application Priority Data

Aug. 11, 2010 (DE) .......................... 10 2010 039 172

(51) Int. Cl.
*F16D 48/06* (2006.01)
(52) U.S. Cl.
USPC ............... 701/51; 701/56; 701/58; 701/66; 701/67; 476/67; 477/34; 477/70
(58) Field of Classification Search
None
See application file for complete search history.

(56) References Cited

U.S. PATENT DOCUMENTS

| | | | | |
|---|---|---|---|---|
| 4,629,045 A * | 12/1986 | Kasai et al. | ...................... | 477/86 |
| 5,337,868 A * | 8/1994 | Liu et al. | .......................... | 477/74 |
| 5,393,274 A * | 2/1995 | Smedley | .......................... | 477/74 |
| 5,681,242 A * | 10/1997 | Bates | ........................... | 477/180 |
| 5,725,454 A | 3/1998 | Yasue et al. | | |
| 5,993,352 A * | 11/1999 | Kosik et al. | ...................... | 477/74 |
| 5,993,355 A * | 11/1999 | Nordg.ang.rd | ................. | 477/174 |
| 6,050,379 A * | 4/2000 | Lyon | .............................. | 192/54.1 |
| 6,086,514 A * | 7/2000 | Jones et al. | ..................... | 477/180 |
| 6,569,060 B2 | 5/2003 | Rosi et al. | | |
| 7,044,280 B2 * | 5/2006 | Budal et al. | .................. | 192/48.9 |
| 8,131,438 B2 * | 3/2012 | Herter et al. | ..................... | 701/68 |
| 2005/0051408 A1 * | 3/2005 | Schwenger et al. | ........ | 192/109 F |
| 2006/0166788 A1 * | 7/2006 | Buchhold | ....................... | 477/166 |
| 2008/0015758 A1 * | 1/2008 | Gierer et al. | .................... | 701/51 |

(Continued)

FOREIGN PATENT DOCUMENTS

| | | |
|---|---|---|
| DE | 196 45 965 A1 | 5/1997 |
| DE | 100 42 147 A1 | 3/2002 |
| DE | 10 2006 001 899 A1 | 7/2007 |

OTHER PUBLICATIONS

German Search Report issued Jun. 20, 2011 for corresponding German Application No. 10 2010 039 172.7.

*Primary Examiner* — Fadey Jabr
*Assistant Examiner* — Krishnan Ramesh
(74) *Attorney, Agent, or Firm* — Davis & Bujold, PLLC; Michael J. Bujold

(57) ABSTRACT

A method of determining an applied actuation touch point pressure value of a frictionally engaged shift element of a transmission at which transmission, via the shift element, is approximately zero, and an increase in pressure relates to an increase of the power transmission via the shift element. The method includes supplying a predefined pressure to the shift element at which power transmission is zero. Increasing the target pressure by an offset pressure to transfer the shift element into a predefined operating state which initiates time monitoring. Determining a characteristic of the actual pressure. After a testing time, a monitoring period is compared with a reference period. When the monitoring period is less than or equal to the reference period, the applied pressure is set to be equivalent with the target pressure.

15 Claims, 3 Drawing Sheets

(56) References Cited

U.S. PATENT DOCUMENTS

| | | | |
|---|---|---|---|
| 2008/0275614 A1* | 11/2008 | Schwenger et al. | 701/68 |
| 2009/0131217 A1* | 5/2009 | Jager et al. | 477/80 |
| 2009/0281700 A1* | 11/2009 | Petzold et al. | 701/68 |
| 2010/0004837 A1* | 1/2010 | Connolly et al. | 701/68 |
| 2010/0048351 A1* | 2/2010 | Sayman | 477/80 |
| 2010/0113218 A1* | 5/2010 | Herter et al. | 477/83 |
| 2010/0114443 A1* | 5/2010 | Terwart et al. | 701/68 |
| 2010/0268428 A1* | 10/2010 | Ellis | 701/67 |
| 2010/0298089 A1* | 11/2010 | Sah | 477/5 |
| 2011/0093175 A1* | 4/2011 | Seel | 701/68 |
| 2011/0098897 A1* | 4/2011 | Busdiecker | 701/67 |
| 2012/0109473 A1* | 5/2012 | Hodrus et al. | 701/51 |
| 2012/0150403 A1* | 6/2012 | Juhlin-Dannfelt | 701/67 |
| 2012/0158265 A1* | 6/2012 | Juhlin-Dannfelt | 701/68 |
| 2012/0247611 A1* | 10/2012 | Martin et al. | 141/1 |
| 2013/0066530 A1* | 3/2013 | Holzer et al. | 701/68 |

* cited by examiner

DETERMINATION METHOD FOR ACTUATION TOUCH POINT PRESSURE VALUE OF A FRICTION SHIFT ELEMENT

This application claims priority from German patent application serial no. 10 2010 039 172.7 filed Aug. 11, 2010.

FIELD OF THE INVENTION

The invention relates to a method for determining an applied actuation pressure value of a frictionally engaged shift element of a transmission device.

BACKGROUND OF THE INVENTION

The transmission capability of a frictionally engaged shift element, for example a multi-disk clutch, multi-disk brake, etc., of a transmission device of a vehicle drive train, in particular a multi-stage automatic transmission or a transverse transfer case, or an all-wheel distributor clutch, can normally be varied by applying an actuation force between a minimum at which the frictionally engaged shift element is completely disengaged and the transmission capability is substantially zero, and a maximum at which the frictionally engaged shift element is substantially fully engaged and is in a slip-free operating state.

In order to change the operating state of the frictionally engaged shift element requested by a higher-level driving strategy in which the frictionally engaged shift element is to be inserted in a flow of force of a vehicle drive train while maintaining a high level of driving comfort, it is necessary to know the precise applied actuation force of the frictionally engaged shift element to be inserted at which the transmission capability of the shift element is substantially zero, and starting at which an increase in the actuating force increases the transmission capability of the shift element. The halves of the frictionally engaged shift element lie against each other, or are in contact with each other, while the actuation force is being applied, without any significant torque being transmitted from one shift element half to the other shift element half, wherein such an operating state of a frictionally engaged shift element is also referred to as the touchpoint. If shift elements of transmission devices are hydraulically actuated, the applied actuation force is provided by a specific applied actuation pressure value which changes over the service life.

Frictionally engaged shift elements which are hydraulically actuated differential locks of transverse transfer cases or all-wheel distributor clutches are operated in a state of permanent slip, as is known. In addition to a robust design, particularly high demands are placed on the actuating precision, actuating dynamics and disengagement dynamics of such frictionally engaged shift elements to provide the optimum driving dynamics for the current driving situation. However, these requirements can be implemented only to the desired extent when the touchpoint of a frictionally engaged shift element is known.

In transmission devices known from practical applications, the touchpoint of frictionally engaged shift elements is determined cyclically over the service life of a frictionally engaged shift element, wherein the applied actuation pressure value is determined by means of rotational speed sensors or torque sensors located in the region of the shift element halves. When sensors are arranged at a distance from the shift element, sophisticated measuring equipment must be used to obtain sufficiently accurate measured values, due to component tolerances.

In addition, sensors arranged in the region of rotating components require construction space and increase the manufacturing cost of a transmission device. Furthermore, the actuation pressure value cannot be adapted depending on the service life when there is a malfunction in the region of the sensors, whereby the servicing of a transmission device is increased to an undesired extent.

SUMMARY OF THE INVENTION

The problem addressed by the present invention is therefore that of providing a method by means of which the applied actuation pressure value of a frictionally engaged shift element can be adapted depending on the service life using a simple design, at low cost and requiring little construction space.

In the method according to the invention to determine an applied actuation pressure value of a frictionally engaged shift element of a transmission device at which the transmission capability of the shift element at least approaches zero and at which an increase in the actuation pressure increases the transmission capability of the shift element, the shift element is supplied with a target actuation pressure value at which the transmission capability is zero. The target actuation pressure is subsequently increased at a testing time by a defined pressure offset value to a pressure level in order to transfer the shift element to a predefined operating state, wherein time monitoring is started and a course of the actual actuation pressure of the shift element is determined. At an evaluation time following the testing time at which the predefined operating state of the shift element is determined depending on the course of the actual actuation pressure, a monitoring period is compared with a defined reference period, and when the monitoring period is found to be less than or equal to the reference period, the applied actuation pressure value is set to be equivalent with the predefined target actuation pressure value.

By means of the procedure according to the invention, a current applied actuation pressure value at which torque is still barely not transmitted by a frictionally engaged shift element, the halves of a shift element rest at least approximately against each other, and starting at which an increase in the actuating pressure results in an immediate increase in the transmission capability can be determined in a structurally simple and low-cost manner requiring little construction space without sensors being located in the region of the frictionally engaged shift element, such as rotary speed sensors or torque sensors assigned to the shift element. In order to determine the applied actuation pressure value of a frictionally engaged shift element that changes over the service life of a transmission device, it is only necessary to know the actual actuation pressure applied to the frictionally engaged shift element, which, for example, can be determined via measurement using pressure sensors that are normally in a transmission device designed with hydraulic shift elements, and little servicing is required.

In a variant of the method according to the invention, when a monitoring period is greater than the reference period, the target actuation pressure value is increased by a specific pressure value, wherein the shift element is then acted upon with the increased target actuation pressure value, and a target actuation pressure which has been increased by the offset pressure value is then applied in the region of the shift element at another testing time, wherein if a current monitoring period is found to be less than or equal to the reference period, the applied actuation pressure value is set to be equivalent to the target actuation pressure value which has been increased by the pressure value. Via appropriate selection of the pressure value, which can be based on empirical values or experimental results, the applied actuation pressure value can be determined easily and quickly.

In a further variant of the method according to the invention, if a current monitoring period is greater than or equal to the reference period, the target actuation pressure value which has been increased by the pressure is increased by an additional pressure value, wherein the shift element is then acted upon with the increased target actuation pressure value, and, in turn, a target actuation pressure value which has been increased by the offset pressure value is subsequently applied in the region of the shift element at another testing time. If a current monitoring period is determined to be greater than or equal to the reference period, the applied actuation pressure value is set to be equal to the target actuation pressure value which has been increased by the additional pressure value. The target actuation pressure is increased by a defined pressure value until the monitoring period is less than or equal to the reference period or a different termination criterion is determined, wherein the applied actuation pressure value of the frictionally engaged shift element is determined with great accuracy using small pressure values.

In an advantageous variant of the method according to the invention, a target actuation pressure value which has been increased by the offset pressure value is specified before the applied actuation pressure value is determined. A check is then carried out to determine whether the actual actuation pressure of the frictionally engaged shift element has reached a predefined pressure range, wherein the determination of the applied actuation pressure value is started with the target actuation pressure value if the result of the query is positive, and the determination is started with the target actuation pressure value that has been increased by an additional pressure value if the result of the query is negative. If the additional pressure value is greater than the pressure value, the current applied actuation pressure value is determined within short operating periods.

In an advantageous embodiment of the method according to the invention, a pressure chamber of the shift element, which can be acted upon with the actual actuation pressure value, is emptied completely before the applied actuation pressure is determined and is then filled with hydraulic fluid during a filling phase and subsequent filling compensation phase, and an actual actuation pressure corresponding to the target actuation pressure value is applied to attain a constant actual actuation pressure having only slight fluctuations before the target actuation pressure increased by the specific offset pressure value is specified.

The features indicated in the claims as well as the features indicated in the following example embodiments of the subject matter of the invention are suitable for developing the subject matter of the invention by themselves or in any combination with each other. The combination of a given set of features does not represent a restriction on the development of the subject matter of the invention and is only largely representative in nature.

BRIEF DESCRIPTION OF THE DRAWINGS

Further advantages and advantageous embodiments of the subject matter of the invention will become apparent from the claims and following example embodiments, the principle of which is described with reference to the drawing.

They show.

DETAILED DESCRIPTION OF THE PREFERRED EMBODIMENTS

Figure 1:
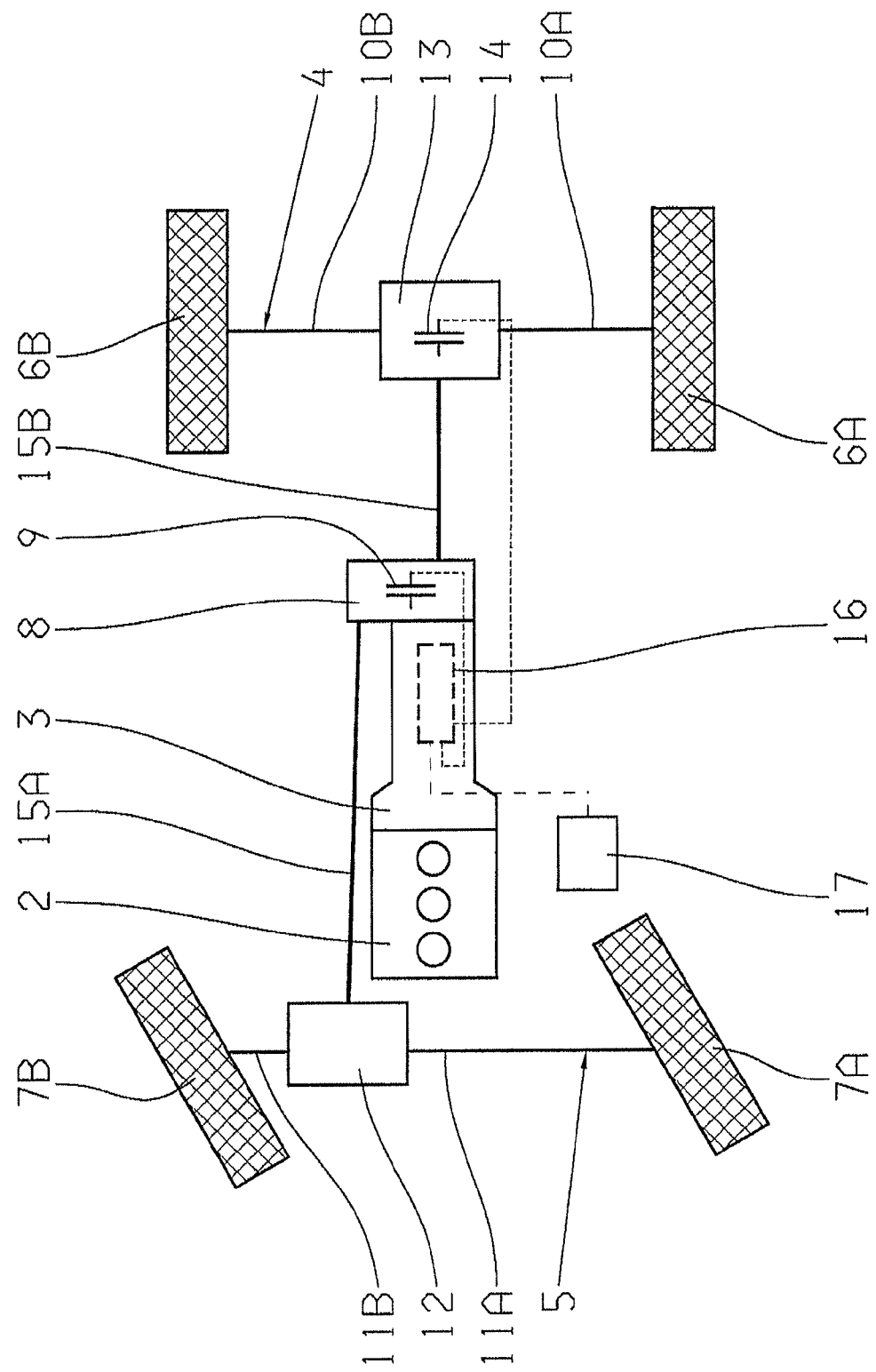
FIG. 1 A schematic representation of a drive train of a motor vehicle having a transfer case and a lockable differential.

FIG. 1 is a highly schematic representation of a drive train 1 of an all-wheel drive vehicle. The drive train 1 comprises a drive motor 2 and a main gearbox 3 that can be any gearbox known from practical applications, and by means of which different transmission ratios for forward and reverse travel can be realized.

The drive train has two drivable vehicle axles 4, 5 that are equipped in a known manner with at least one drive wheel 6A, 6B and 7A, 7B on each side of the vehicle, and in which vehicle axle 4 is the vehicle rear axle in the present case and vehicle axle 5 is the vehicle front axle. Between the main gearbox and the vehicle axles 4, 5, a transmission device 8 designed as a longitudinal transfer case is disposed by means of which drive, torque of the drive motor 2 applied to an input shaft, not shown in the drawing, is distributed via a first longitudinal vehicle shaft 15A and a second longitudinal vehicle shaft 15B between the vehicle rear axle 4 and vehicle front axle 5. To variably adjust the degree of distribution of the drive torque between the vehicle rear axle 4 and vehicle front axle 5, the longitudinal transfer case 8 has a frictionally engaged shift element 9 designed as a multi-disk clutch.

To distribute the portion of drive torque supplied to the vehicle axles 4, 5 between two output shafts 10A, 10B and 11A, 11B being respectively connected to the drive wheels 6A, 6B and 7A, 7B and assigned to a vehicle axle 4, 5, a transverse transfer case 12 and 13 is provided between the longitudinal transfer case 8 and drive wheels 6A, 6B and 7A, 7B. Both the transverse transfer case 12 assigned to the vehicle front axle 5 as well as the transverse transfer case 13 assigned to the vehicle rear axle 4 are designed as differentials. The differential 13 disposed in the region of the vehicle rear axle 4 also has a frictionally engaged shift element 14 by means of which torque applied to the vehicle longitudinal shaft 15B of the differential 13 can be variably distributed between the output shafts 10A and 10B of the differential 13 and the drive wheels 6A,6B of the vehicle rear axle 4. The frictionally engaged shift element 14 designed in the present case as a hydraulically actuated multi-disk clutch representing a differential lock is actuatable with pneumatic means in alternative embodiments of the invention. To actuate the multi-disk clutches 9 and 14, a hydraulic control unit 16 controlled by an electronic transmission control unit 17 is provided in the present case.

In the present case, the multi-disk clutch 14 is disposed between an output shaft 10A of the differential 13 and a differential carrier of the differential 13. When the multi-disk clutch 14 is in a disengaged operating state, torque applied to the differential 13 is evenly distributed between the output shafts 10A, 10B. The amount of torque that can be transmitted to the output shafts 10A, 10B is dependent upon the output shaft 10A and 10B, and upon the respective drive wheel 6A, 6B connected thereto, in the region of which the lower torque can be transferred in the current operating state of the drive train 1. When a drive wheel 6A or 6B positioned on slippery ice spins, for instance, the other drive wheel 6B or 6A is therefore not supplied with more torque than the spinning drive wheel 6A or 6B, even if it is positioned on a non-slip surface. In such a driving situation, the vehicle is unable to move forward, which is disadvantageous, due to the compensatory effect of the differential 13, which makes it possible for the two output shafts 10A, 10B to rotate at different speeds.

To counteract such a situation, the degree to which the differential is locked can be varied by changing the transmission capability of the multi-disk clutch 14 such that torque is transmitted to the output shaft 10A or 10B connected to the drive wheel 6A or 6B, respectively, that has the lesser degree of slippage.

To this end, the electronic transmission control unit 17 specifies a target transmission capability of the shift element 14 or an equivalent thereto or a target torque to be conducted via the shift element 14 necessary to achieve the desired degree of distribution. The target actuation pressure p_SBD necessary to create the specified target transmission capability is output in the region of the hydraulic control unit 16. The transmission capability of the multi-disk clutch 14 increases as the actual actuation pressure p_IBD rises, and the torque conductable via the shift element 14 also increases.

Consequently, a torque applied to the vehicle longitudinal shaft 15B of the differential 13 is distributed between the output shafts 10A, 10B with a degree distribution appropriate to the current driving situation. Depending on the level of the target actuation pressure p_SBD specified with reference to the target torque, the degree of distribution can be adapted to changing driving situations.

To quickly and precisely adjust a desired degree of distribution, the touchpoint of the multi-disk clutch 14 must be known or an equivalent applied actuation pressure value p_ABDW of an actual actuation pressure p_IBD actually applied to the multi-disk clutch 14 at which a transmission capability of the multi-disk clutch 14 is at least nearly zero, and starting at which an increase in the actual actuating pressure p_IBD applied to the multi-disk clutch 14 elevates the transmission capability of the multi-disk clutch 14. The applied actuation pressure value p_ABDW varies over the service life of the multi-disk clutch 14, for example due to wear in the region of the lining disks, and a range of the applied actuating pressure value p_ABDW of the multi-disk clutch 14 lies between 1.0 bar and 1.8 bar in this case.

To sufficiently satisfy the high demands regarding the setting precision, dynamic response and opening dynamics, placed on the multi-disk clutch 14 over the entire service life of the shift element 14, a current applied actuating pressure value p_ABDW or the touchpoint of shift element 14 is cyclically determined in the manner described below, where a cycle corresponds for example to a specific operating time or a predetermined driving performance of the differential 13.

The method described below can also be analogously used to determine the touchpoint of the multi-disk clutch 9 of the longitudinal transfer case 8 or other frictionally engaged shift elements such as clutches or brakes of other transmission devices such as multistage automatic transmissions, etc.

Once the expiration of a cycle is determined, there is an initial check to determine if the drive train is in a predefined operating state 1 during which the shift element 14 can be actuated independent of the setpoint specified by a torque setpoint generator. While determining the applied actuation pressure value p_ABDW, the multi-disk clutch 14 is not supplied with an actuating pressure necessary to set a current target transmission capability requested by the torque setpoint generator of the transmission control 17; rather, it is actuated according to a specified characteristic of the target actuation pressure p_SBD triggered by the current target transmission capability to be set.

There is also verification of whether a target transmission capability of the shift element 14 currently requested by the transmission control 17 is almost constantly below a specified maximum over a predetermined period and does not leave a specific, permissible fluctuation range. This test functionality is preferably implemented in the torque setpoint generator that triggers the determination of the applied actuation pressure Value p_ABDW when a permissible characteristic of the target transmission capability exists, possibly taking into account additional operating parameters such as a current slope of a road which lies below a slope threshold.

Depending on the existing application, an additional check is carried out to determine whether a current driving speed lies within a specific speed range such as 30 km/h to 150 km/h, in certain circumstances before determining the concurrent applied actuation pressure value p_ABDW, whether a current speed of the drive motor 2 is within a specific speed range, whether a current operating temperature of the rear differential 13 measured with a temperature sensor exceeds a specified minimum, whether a dynamic control system is active, whether a steering wheel angle lies within a predefined range to ensure at least approximately constant straight driving, and whether a pressure sensor provided to measure the actual actuation pressure p_IBD of the shift element 14 is functional. There is an additional check to determine whether an operating state characteristic of the vehicle is substantially constant, whereby a constant operating state characteristic is recognized when there is no request to change the transmission ratio currently applied in the main gearbox 3, and when a current driving speed, current depression of the accelerator, current steering wheel angle and current speed of the drive motor 2 lie with in a predefined range.

If it is found during the test that at least one criterion of the aforementioned test criteria is not met, or if only a selection of the test criteria or other suitable initial conditions are not met in variations of the method, the applied actuation pressure value p_ABDW is not determined. If the specified start conditions are met, especially over a predefined period, for example over a period of 2 seconds, the method for determining the applied actuation pressure value p_ABDW is started.

The method is terminated if one of the aforementioned conditions is no longer maintained during the method. Furthermore, the method is terminated in a different version when an actual actuation pressure p_IBD applied to the multi-disk clutch 14 while determining the applied actuation pressure value p_ABDW is greater than a target actuation pressure specified by the torque setpoint generator on the basis of the current driving situation.

The plausibility of the actual transmission capability resulting from the actual actuation pressure p_IBD currently applied to the shift element 14 is monitored with the assistance of the required target transmission capability of the shift element. To prevent error messages from being generated by the permanent plausibility routine while determining the applied actuation pressure value p_ABDW, a calculated, actual transmission capability of the shift element 14 stored in the transmission control 17 is replaced by the specified target transmission capability.

Figure 2:
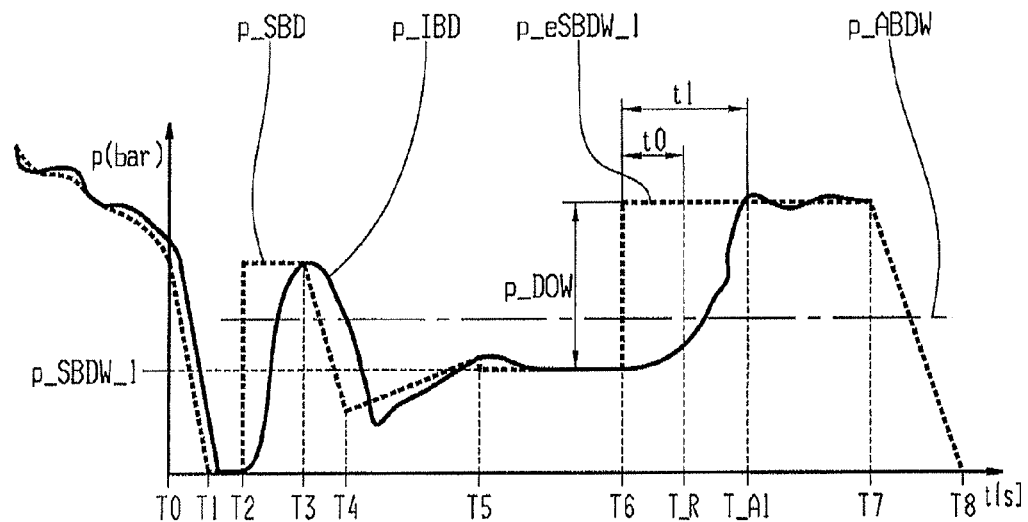
FIG. 2 Initial segments of courses of a target actuation pressure and an actual actuation pressure of a frictionally engaged shift element that occur during a determination, according to the invention, of an applied actuation pressure value of a frictionally engaged shift element of the drive train according to FIG. 1 or a touchpoint of the shift element.

FIG. 2 shows a characteristic of the target actuation pressure p_SBD and a characteristic of the actual actuation pressure p_IBD that are specified while determining the applied actuation pressure value p_ABDW, or arise as a result of the specified setpoint. The applied actuation pressure value p_ABDW currently stored in the transmission control is also shown in FIG. 2.

At time T0, there is a request to determine the applied actuation pressure value p_ABDW. Starting at a target actuation pressure value p_SBD specified by the torque setpoint generator at time T0, a pressure chamber of the multi-disk clutch 15 that can be supplied with the actual actuation pressure p_IBD and neighbors a hydraulic plunger is first completely vented by a pressure ramp of the target actuation pressure p_SBD lasting until time T1. At time T1, the target actuation pressure p_SBD is at least nearly zero and is kept at this level until time T2.

During a subsequent filling phase between times T2 and T3, a pulse of the target actuation pressure p_SBD is specified. During a filling compensation phase subsequent thereto, a target actuation pressure p_SBD is lowered between time T3 and time T4 over a pressure ramp to a value below the first target actuation pressure value p_SBDW_1. Subsequent thereto, the target actuation pressure p_SBD is elevated over an additional pressure ramp lasting until time T5 to a value above the first target actuation pressure value p_SBDW_1. At time T5, a difference between the actual actuation pressure p_IBD currently applied to the shift element 14 and the currently specified target actuation pressure p_SBD is less than the predefined threshold, and the target actuation pressure p_SBD is then adjusted to the level of the first target actuation pressure value p_SBDW_1.

By means of the procedure executed between times T0 to T5, the actual actuation pressure p_IBD is adjusted during brief operating times to the first target actuation pressure value p_SBDW_1. Furthermore, by means of the procedure for adjusting the actual actuation pressure p_IBD, a current actual actuation pressure is set depending on a current target actuation pressure value while there are simultaneously low loads in the region of a pressure regulator.

By means of the setpoint specified between time T5 and a subsequent time T6 for the first target actuation pressure value p_SBDW_1, the multi-disk clutch 14 is transferred into a specific operating state in which no torque is transmitted via the shift element 14. This is because the first target actuation pressure value p_SBDW_1 is less than the current, stored applied actuation pressure value p_ABDW. In the presently described example embodiment, the applied actuation pressure value p_ABDW fluctuates between 1.0 bar and 1.8 bar depending on the operating state, which is why the first target actuation pressure value p_SBDW_1 is set to a value of 0.9 bar.

At time T6, the first target actuation pressure value p_SBDW_1 is elevated by a predefined offset pressure value p_DOW that is 0.5 bar in the present case. By specifying the first elevated target actuation pressure value p_eSBDW_1, the multi-disk clutch 14 is transferred into a different, predefined, especially slip-free operating state.

Simultaneously at time T6 or at the testing time, time monitoring starts, and a monitoring period t1 it is determined that ends at an evaluation time T_A1 at which the other specified, slip-free operating state of the multi-disk clutch 14 is determined depending on the characteristic of the actual actuation pressure p_IBD, the actual actuation pressure p_IBD at time T_A1 corresponding to the increased target actuation pressure value p_eSBDW. The pressure regulator is deactivated at time T6 so as not to influence the change in the actual actuation pressure p_SBDW_1 depending on the target actuation pressure p_IBD after the first target actuation pressure value p_SBDW_1 is elevated by offset pressure value p_DOW.

To determine whether the first target actuation pressure value p_SBDW_1 corresponds to the applied actuation pressure value p_ABDW of the shift element 14, the monitoring period t1 is compared with a reference period t0 that, in the present case, lasts from testing time T6 until time T_R. If monitoring period t1 is greater than reference period t0, it is determined that the first target actuation pressure value p_SBDW_1 is less than the applied actuation pressure value p_ABDW necessary to indicate the touchpoint of shift element 14. If the determined to monitoring period t1 is less than or equal to the reference period t0, the first target actuation pressure value is specified as the new applied actuation pressure value p_ABDW.

The last-cited procedure is based on the knowledge that the evaluation time T_A1 is before the reference time T_R when the target actuation pressure p_SBD is elevated by the offset pressure value p_DOW starting at a pressure level corresponding to the actuation pressure value p_ABDW, or a higher pressure level. If however the evaluation time T_A1 follows the reference time T_R, it is determined that the target actuation pressure p_SBD it was increased at time T6 by the offset pressure value p_DOW starting at a pressure level line below the level of the applied actuation pressure value p_ABDW.

The reference period t0 is preferably determined empirically, wherein an applied actuation pressure value p_ABDW measured by means of torque sensors is subject to the offset pressure value p_DOW, and a period is determined after which the multi-disk clutch 14 is in the additional, predefined operating state.

The value of the reference period t0 based on the adaptation according to the invention is not changed over the service life, and the value can be changed to an appropriate extent depending on the existing application over the service life of the shift element to improve the quality of the adaptation of the applied actuation pressure value of the shift element 14.

Since the monitoring period t1 is greater than the reference period t0, the target actuation pressure p_SBD is reduced to essentially zero starting at time T7 over a pressure ramp lasting until another time T8, and the pressure chamber of the shift element 14 is vented due to the actual actuation pressure p_IBD that is also decreasing.

Figure 3:
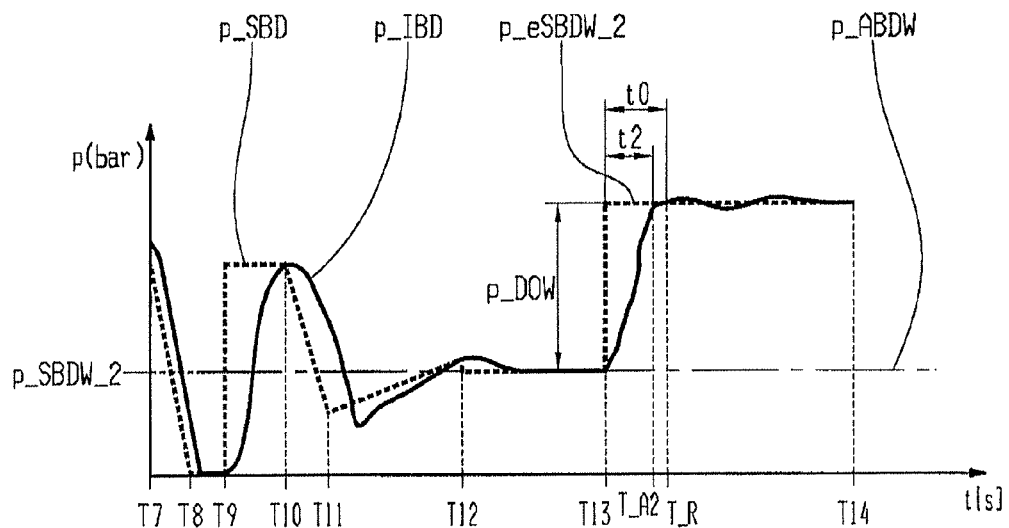
FIG. 3 Second segments of the courses of the target actuation pressure and the actual actuation pressure of the frictionally engaged shift element during the determination, according to the invention, of the touchpoint of the shift element, the segments following the first sections of the pressure courses according to FIG. 2.

Subsequently, the target actuation pressure p_SBD is maintained at this level until another time T9 in the manner depicted in FIG. 3. Starting at time T9, the procedure described with reference to FIG. 2 between times T2 to T6 is repeated at times T9 to 13. The first target actuation pressure p_SBDW_1 is increased by a specific pressure value, 0.2 bar in this case, to a second target actuation pressure value p_SBDW_2.

Between times T9 and T10, the characteristic of the target actuation pressure p_SBD manifests a pressure pulse, and the negative pressure ramp that previously ended at time T4 follows until time T11. This is followed by the positive pressure ramp which ends at time T12 and which previously extended until time T5. Until time T13, the target actuation pressure p_SBD is kept at the level of the second target actuation pressure value p_SBDW_2.

At time T13 at which the actual actuation pressure p_IBD again at least approximately corresponds to target actuation pressure p_SBD to the same extent as at time T6, the second target actuation pressure value p_SBDW_2 is again increased by the constant offset pressure value p_DOW, and time monitoring is restarted.

Due to the second target actuation pressure value p_SBDW_2 which has been increased by the pressure value in comparison to the first target actuation pressure value p_SBDW_1, a second monitoring period t2 that was determined while monitoring the time and which ends in this case at time T_A2 is shorter than the first monitoring period t1. This is because the second target actuation pressure value p_SBDW_2 is closer to the applied actuation pressure value p_ABDW, and the other unspecified operating state of the shift element 14 is earlier.

The determined second monitoring period t2 is less than the reference period t0 in this case; consequently, the second target actuation pressure value p_SBDW_2 is initially set as the applied actuation pressure value p_ABDW. To enhance the adaptation quality and almost certainly prevent the applied actuation pressure value p_ABDW from being incorrectly determined, the second adaptation loop executed between times T7 to T14 is repeated twice to the aforementioned extent with the second target actuation pressure value p_SBDW in this case or a slightly higher pressure, and the method ends with the same final results as at time T_14.

Otherwise, the adaptation loop is repeated with the target actuation pressure value increased by the pressure value in comparison to the previous adaptation loop until the monitoring period is less than or equal to the reference period over three sequential adaptation loops with the same target actuation pressure value. Subsequently, the current target actuation pressure value is stored as the new actuation pressure value in the transmission control 17 and used in the continuing operation of the shift element 14, and the method is ended.

If the second monitoring period t2 is greater than the reference period t0, the pressure chamber of the shift element 14 is vented starting at time T14 to the same extent as after time T7, and the adaptation loop between times T8 to T14 is increased with an additional target actuation pressure value increased by the specific pressure value in comparison to the second target actuation pressure value p_SBDW. In this case as well, the adaptation loop is repeated until a monitoring period is determined that is less than or equal to the reference period over three sequential adaptation loops with the same target actuation pressure. Subsequently, the target actuation pressure value is stored as the new actuation pressure value in the transmission control 17 and used in the continuing operation of the shift element 14, and the method is ended.

Depending on the existing application, the pressure value remains the same for each application loop, or it is changed depending on the operating state to achieve high adaptation quality.

When the method is over, the target actuation pressure p_SBD is set at a current pressure level specified by the torque setpoint generator starting at the target actuation pressure specified at the end of the method.

With the exception of the period lying between times T4 and T5 or T11 and T12, all of the periods delimited by two neighboring times are the same length over sequential adaptation loops, and an appropriate duration of the different periods is determined experimentally. In an alternative embodiment of the invention, the length of the different periods can also vary during different adaptation loops.

In one variant of the method, the extent of the specified preparation phase for shift element 14 between times T0 to T6 and T7 to T13 can differ or be completely eliminated during sequential adaptation loops. In the latter case, the target actuation pressure is changed directly from the target pressure level set by the torque setpoint generator to the level of the first target actuation pressure value during the first adaptation loop, and the determination of the monitoring period and subsequent evaluation remain unchanged.

If the determination of the applied actuation pressure p_ABDW is terminated during a test cycle, for example because the predefined driving state no longer exists, the target actuation pressure p_SBD is changed directly from a current target actuation pressure value to a pressure level that is specified by the torque setpoint generator. If the aforementioned initial conditions are met at a later time and the predefined driving state exists, the applied actuation pressure value p_ABDW continues to be determined in the adaptation loop during which the determination method was interrupted.

To ensure that the multi-disk clutch 14 remains in a slip free operating state during the first adaptation loop after the first target actuation pressure value p_SBDW_1 is increased by the offset pressure value p_DOW so that comparable old test conditions exist for all the adaptation loops, the specified target actuation pressure during one of the checking routines before the first adaptation loop is the same as in the first adaptation loop. The previous checking routine is used to determine if the actual actuation pressure p_IBD has reached a level that lies within a specified pressure range around the increased target actuation pressure value after time p_eSBDW_1 existing after time T6.

If the response to the query by the checking routine is positive, the multi-disk clutch 14 is supplied with an actual actuation pressure corresponding to the increased, first target actuation pressure p_eSBDW_1, and the multi-disk clutch can be changed to a slip-free operating state during the first adaptation loop following the checking routine.

If the response to the query is negative, it is recognized that the multi-disk clutch 14 cannot be changed to a slip-free operating state by specifying the increased target actuation pressure value p_eSBDW_1 during the first adaptation loop, and the first target actuation pressure value p_SBDW_1 differs too much from the applied actuation pressure value p_ABDW to be determined.

To establish a predefined operating state for the multi-disk clutch 14 that is comparable for all adaptation loops with the target actuation pressure value p_eSBDW increased by the offset pressure value p_DOW, and to allow the applied actuation pressure value p_ABDW to be quickly determined, the first target actuation pressure value p_SBDW_1 specified for the first adaptation loop is increased when the response to the query of the checking routine is negative by an additional pressure value of e.g. 0.1 bar that, in particular, is greater than the pressure value. Subsequently, the checking routine is rerun using the target actuation pressure value increased by the additional pressure value with verification of whether the actual actuation pressure has reached the predefined pressure level. This procedure is also continued until the response to the checking routine's query is positive.

Alternately, the adaptation loop can start immediately after the checking routine has run once, and the first target actuation pressure value increased by the additional pressure value is used during the first adaptation loop.

The evaluation time T_A can be determined by a subsequent evaluation routine or simultaneously by both evaluation routines at the end of each adaptation loop described below with reference to FIG. 4 or FIG. 5.

Figure 4:
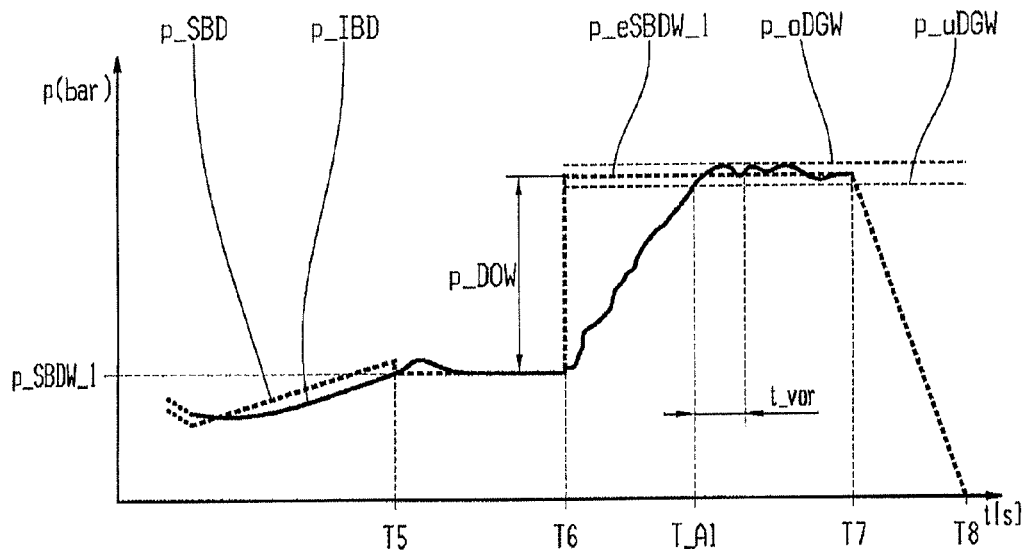
FIG. 4 A representation of the courses according to FIG. 2 of the target actuation pressure and the actual actuation pressure of the frictionally engaged shift element during the determination, according to the invention, of the touchpoint of the shift element, the characteristics resulting from a first variant of the method according to the invention.

The evaluation time T_A1 is then determined during the first adaptation loop as shown in greater detail in FIG. 4 when the actual actuation pressure p_IBD after testing time T6 at least approximately corresponds to the increased first target actuation pressure value p_eSBDW_1. Since the actual actuation pressure p_IBD fluctuates depending on the existing operating state of the shift element 14 and the hydraulic system for supplying the shift element 14 with actuation pressure, a time is determined as the first evaluation time T_A1 from which the actual actuation pressure p_IBD lies with in a pressure range limited by a top pressure threshold p_oDGW and a bottom pressure threshold p_uDGW and around the increased, first target actuation pressure value p_eSBDW_1, and remains within this pressure range at least over a predetermined period t_vor starting at this time.

To enable the pressure range defined by the top pressure threshold p_oDGW and bottom pressure threshold p_uDGW to be placed as closely as possible around and the increased target actuation pressure value assigned to the respective adaptation loop and to keep the applied actuation pressure value p_ABDW from being incorrectly identified, one variant of the method according to the invention provides running an adjusting routine before the first adaptation loop. During the adjusting routine that substantially corresponds to the procedure between times T0 to T6, an actual offset pressure value is determined that corresponds to the difference between an actual actuation pressure value existing at a specific time after the offset pressure value p_DOW has been applied to the multi-disk clutch 14 and and actual actuation pressure value existing at time T6.

The adjusting routine is run several times, preferably three times, and the minimum and maximum of the determined actual offset pressure values are used for further evaluation. If the difference between the maximum actual offset pressure value determined during an adjusting routine and the minimum actual offset pressure value determined during another adjusting routine is greater than a specified threshold, the determination of the actual offset pressure value was unsuccessful and is repeated.

The pressure thresholds p_uDGW and p_oDGW defining the pressure window around the increased, first target actuation pressure value p_eSBDW_1 are also increased by the pressure value for each new adaptation loop that is executed with the target actuation pressure value p_SBDW increased by the pressure value. Depending on the existing application, it is however also possible to adapt the pressure thresholds p_uDGW and p_oDGW in a different manner to the changed evaluation conditions.

Figure 5:
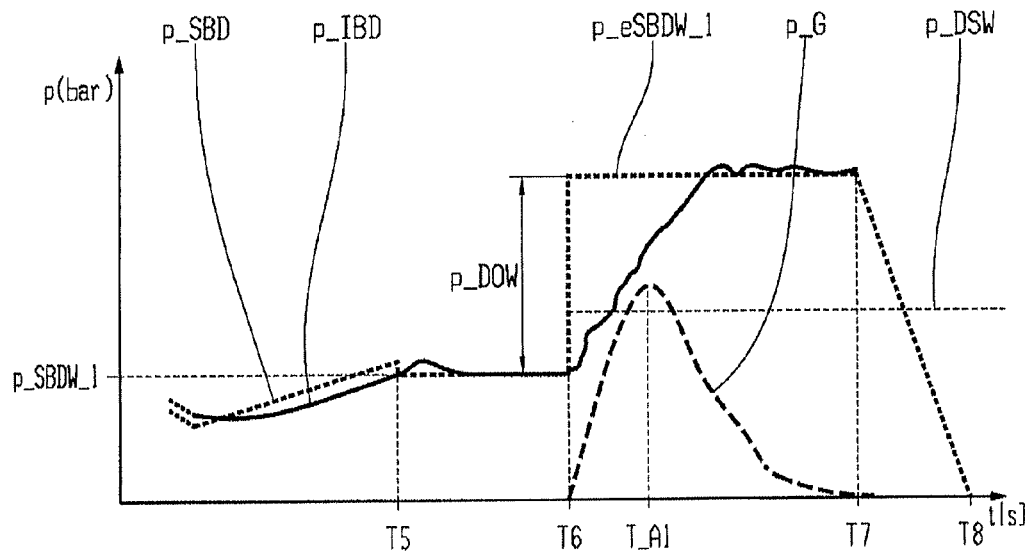
FIG. 5 A representation of the pressure characteristics according to FIG. 2 of the target actuation pressure and the actual actuation pressure of the frictionally engaged shift element during the determination, according to the invention, the touchpoint of the shift element, the characteristics resulting from a second variant of the method according to the invention.

During the second evaluation routine for determining the first evaluation time T_A1 according to FIG. 5, a gradient p_G of the characteristic for the actual actuation pressure p_IBD is determined and used during an adaptation loop to identify the evaluation time T_A. During the first adaptation loop when the gradient p_G is at a maximum, the evaluation time T_A1 is determined after time T6 or a time corresponding to time T6 during other adaptation loops.

To reduce errors when determining the first evaluation time T_A1, the maximum gradient p_G of the characteristic of the actual actuation pressure p_IBD is only determined when the actual actuation pressure p_IBD is simultaneously greater than a pressure threshold p_DSW, and/or the maximum gradient p_G is greater than a threshold not presented in greater detail. This variation of the second evaluation routine for determining the evaluation time T_A is based on the knowledge that the gradient p_G of the characteristic of the actual actuation pressure p_IBD attains its maximum shortly before the slip-free operating state of the multi-disk clutch 14 is reached.

The pressure threshold p_DSW and the threshold of the gradient p_G are also suitably adapted to the changed evaluation conditions in view of the changed target actuation pressure values underlying the adaptation loops.

Since the evaluation time T_A determined by the first evaluation routine may differ from the evaluation time T_A determined by the second evaluation routine, another variant of the method according to the invention varies the reference period used during an adaptation loop depending on the evaluation routine.

If, during an adaptation loop, an evaluation time T_A is determined by the first evaluation routine and the second evaluation routine, another variant of the method renders the applied actuation pressure value p_ABDW equal to the first target actuation pressure value p_SBDW_1 when one of the determined monitoring periods is less than or equal to the corresponding reference period t0. The applied actuation pressure value p_ABDW can also only be rendered equal to the first target actuation pressure value p_SBDW_1 when both monitoring periods are less than or equal to the respective reference period.

In another variant of the method according to the invention, monitoring is also carried out to determine whether a resetting element which actuates multi-disk clutch 14 in the direction of disengagement, in particular a spring device, increases in a monotonous manner, and whether the pressure chamber between times T6 and T7 does not increase while the applied actuation pressure value p_ABDW is being determined. Error-free determination of the applied actuation pressure value p_ABDW is thereby ensured in a simple manner.

REFERENCE CHARACTERS

1 Drive train
2 Drive motor
3 Main gearbox
4 Vehicle rear axle
5 Vehicle front axle
6A, 6B Drive wheel
7A, 7B Drive wheel
8 Longitudinal transfer case
9 Multi-disk clutch
10A, 10B Output shaft
11A, 11B Output shaft
12 Front differential
13 Rear differential
14 Multi-disk clutch
15A, 15B Vehicle longitudinal shaft
16 Hydraulic control unit
17 Electronic transmission control
p_ABDW Applied actuation pressure value
p_DOW Offset pressure value
p_DSW Pressure threshold value
p_DW Pressure value
p_eSBDW_1 Increased first target actuation pressure value
p_G Gradient of the course of the actual actuation pressure
p_IBD Actual actuation pressure
p_oDGW Upper pressure threshold value p_SBD Target actuation pressure
p_SBDW_1 First target actuation pressure value
p_uDGW Lower pressure threshold value
T0 to T14, T_R Discrete time
T_A Evaluation time
t0 Reference time period
t1 First monitoring period
t2 Second monitoring period
t_vor Specified time period

The invention claimed is:

1. A method of determining an actuation touch point pressure value (p_ABDW) of a frictionally engagable shift element (14) of a transmission device (8, 13) at which a transmission capability of the shift element (14) at least approaches zero and at which an increase in actuation pressure (p_IBD) elevates the transmission capability of the shift element (14), the method comprising the steps of:

supplying the shift element (14) with a predefined target actuation pressure (p_SBDW_1) at which the transmission capability is zero;

increasing target actuation pressure (pSBD) to a pressure level (p_eSBDW_1) by a specific offset pressure (p_DOW) at a testing time (T6) to transfer the shift element (14) into a predefined operating state which instigates time monitoring;

determining, by an electronic control unit, a characteristic of the actual actuation pressure (p_IBD) of the shift element (14);

comparing a monitoring period (t1) with a specific reference period (t0) after an evaluation time (T_A1) following the testing time (T6) at which the predefined operating state of the shift element (14) is determined depending on the characteristic of the actual actuation pressure (p_IBD);

setting the applied actuation touch pressure value (p_ABDW), when the monitoring period (t1) is found to be less than or equal to the reference period (t0), to be equivalent with the predefined target actuation pressure value (p_SBDW_1);

increasing the predefined target actuation pressure value (p_SBDW_1) by a specific pressure value when the monitoring period (t1) is greater than the reference period (t0); and supplying the shift element (14) with the elevated target actuation pressure value (p_SBW_2), increasing a target actuation pressure (p_eSBDW_2) by the offset pressure (p_DOW) subsequently being applied in the region of the shift element (14) at another testing time (T6), and when a current monitoring period (t2) is found to be less than or equal to the reference period (t0), setting the applied actuation pressure value (p_ABDW) to be equivalent to the elevated target actuation pressure value (p_SBDW_2) increased by the pressure value.

2. The method according to claim 1, further comprising the step of elevating the target actuation pressure value that was increased by the pressure value, by an additional pressure value when a current monitoring period is again greater than or equal to the reference period (t0), the shift element (15) subsequently being supplied with the increased target actuation pressure value, and a target actuation pressure value increased by the offset pressure value (p_DOW) subsequently being applied in the region of the shift element (14) at another testing time, and when a current monitoring period is found to be less than or equal to the reference period (t0), the applied actuation pressure value (p_ABDW) is set to be equivalent to the target actuation pressure value increased by the pressure value, and the target actuation pressure value is increased by a specific pressure value until the monitoring period is less than or equal to the reference period (t0) or a different termination criterion is determined.

3. The method according to claim 1, further comprising the step of defining the predefined operating state of the shift element (14) as an at least approximately slip-free operating state of the shift element (14).

4. The method according to claim 1, further comprising the step of always starting the time monitoring at the another testing time (T6, T13).

5. The method according to claim 4, further comprising the step of defining the current monitoring period (t1, t2) as always extending between the another testing time (T6, T13) and the evaluation time (T_A1, T_A2) at which the actual actuation pressure value (p_IBD) substantially corresponds to the target actuation pressure value (p_eSBDW_1, p_eSBDW_2) elevated by the offset pressure value (p_DOW).

6. The method according to claim 5, further comprising the step of defining the end of the monitoring period (t1) as being when the actual actuation pressure value (p_IBD) lies within a pressure range limited by an upper pressure limit (p_oDGW) and a lower pressure limit (p_uDGW) and is around the target actuation pressure value (p_eSBDW_1, p_eSBDW_2) increased by the offset pressure value (p_DOW).

7. The method according to claim 6, further comprising the step of defining the end of the monitoring period (t1) as being when the actual actuation pressure (p_IBD) lies within the pressure range at least over a specified period (t_vor).

8. The method according to claim 1, further comprising the step of defining the of the monitoring period (t1) as being when a maximum gradient (p_G) of the characteristic of the actual actuation pressure (p_IBD) exists.

9. The method according to claim 8, further comprising the step of defining the maximum gradient (p_G) of the characteristic of the actual actuation pressure (p_IBD) as being when at least one of the actual actuation pressure (p_IBD) and the gradient (p_G) of the characteristic of the actual actuation pressure (p_IBD) is greater than a threshold (p_DSW).

10. The method according to claim 1, further comprising the step of specifying a target actuation pressure value (p_eSBDW_1) that is increased by the offset pressure value (p_DOW), before the applied actuation pressure value (p_ABDW) is determined, and the actual actuation pressure (p_IBD) is checked to see if the actual actuation pressure (p_IBD) has reached a predefined pressure range, the determination of the applied actuation pressure value (p_ABDW) being started with the target actuation pressure value (p_SBDW_1, p_SBDW_2) when the result of the query is positive, and the determination being started with the target actuation pressure value increased by an additional pressure value when the result of the query is negative.

11. The method according to claim 1, further comprising the step of completely venting a pressure chamber of the shift element (14), supplied with the actual actuation pressure (p_IBD), before the applied actuation pressure value (p_ABDW) is determined and then filling the pressure chamber of the shift element (14) with hydraulic fluid during a filling phase and subsequent filling compensation phase, and an actual actuation pressure (p_IBD) corresponding to the target actuation pressure value (p_SBDW_1, p_SBDW_2) is applied.

12. The method according to claim 1, further comprising the step of venting to a pressure chamber of the shift element (14), before another adaptation loop, when a monitoring period (t1) is greater than the reference period (t0), and then filling the pressure chamber of the shift element (14) with hydraulic fluid during a filling phase and a subsequent showing compensation phase, and applying an actual actuation pressure (p_IBD) corresponding to the target actuation pressure value (p_SBDW_2).

13. The method according to claim 1, further comprising the step of defining the applied actuation pressure value (p_ABDW) as an applied actuation pressure value of the shift element (14) of the transmission device (8, 13) of the drive train (1) of the motor vehicle.

14. The method according to claim 13, further comprising the step of using one of a transverse and a longitudinal transfer case as the transmission device (8, 13) of the drive train (1) of the motor vehicle.

15. The method according to claim 1, further comprising the step of the determining the applied actuation pressure value (p_ABDW) cyclically when a predefined operating state of the drive train (1) exists, and the determination of the applied actuation pressure value (p_ABDW) is terminated when a deviation from the predefined operating state of the drive train (1) is greater than a threshold, and the determination is continued in the state existing at the termination once the predefined operating state exists again.

* * * * *